US 6,578,896 B1

(12) United States Patent  (10) Patent No.: US 6,578,896 B1
Peterson  (45) Date of Patent: Jun. 17, 2003

(54) MAT FOR A MOTOR VEHICLE CARGO COMPARTMENT

(75) Inventor: Robb A Peterson, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/235,209

(22) Filed: Sep. 5, 2002

(51) Int. Cl.⁷ .............................................. B62D 25/20
(52) U.S. Cl. ................. 296/97.23; 296/39.2; 296/208
(58) Field of Search ............................ 296/39.1, 39.2, 296/97.23, 208

(56) References Cited

U.S. PATENT DOCUMENTS

| | | | | |
|---|---|---|---|---|
| 3,050,329 A | * | 8/1962 | Pagan ..................... | 296/97.23 |
| 4,188,058 A | * | 2/1980 | Resa et al. .................. | 296/208 |
| 4,279,439 A | * | 7/1981 | Cantieri ..................... | 296/39.2 |
| 4,944,612 A | * | 7/1990 | Abstetar et al. ........... | 296/39.2 |
| 5,417,465 A | * | 5/1995 | Koppenstein et al. ...... | 296/39.1 |
| 5,527,081 A | * | 6/1996 | Rausch et al. .............. | 296/186 |
| 5,695,235 A | * | 12/1997 | Martindale et al. ........ | 296/39.2 |
| 5,795,007 A | * | 8/1998 | Yamamoto ................. | 296/39.2 |
| 6,145,909 A | * | 11/2000 | Staley et al. ............... | 296/39.1 |
| 6,444,284 B1 | * | 9/2002 | Kessler et al. ................ | 428/45 |

FOREIGN PATENT DOCUMENTS

JP          11321710 A   * 11/1999   .......... B62D/25/08

* cited by examiner

Primary Examiner—D. Glenn Dayoan
Assistant Examiner—Patricia L. Engle
(74) Attorney, Agent, or Firm—Laura C. Hargitt

(57) ABSTRACT

A rigid removable cargo mat extends over and is supported by a sheet metal floor in the cargo compartment of a motor vehicle and has an integral rear sill plate portion extending into a rear entry/exit way that provides for access to the cargo compartment. The cargo mat has channels that collect any liquid deposited on the mat and are adapted to drain such from the vehicle in both a forward direction and a rearward direction from the mat via the floor below as well as out the rear entry/exit way. The cargo mat is a molded lightweight part formed of a plastic composition with a skin containing a color pigment complementing the color scheme of the vehicle's interior trim. The cargo mat is adapted for easy removal by being fastened to the floor by a tab at the front end of the mat and by easily releasable fasteners at the rear end of the mat.

21 Claims, 9 Drawing Sheets

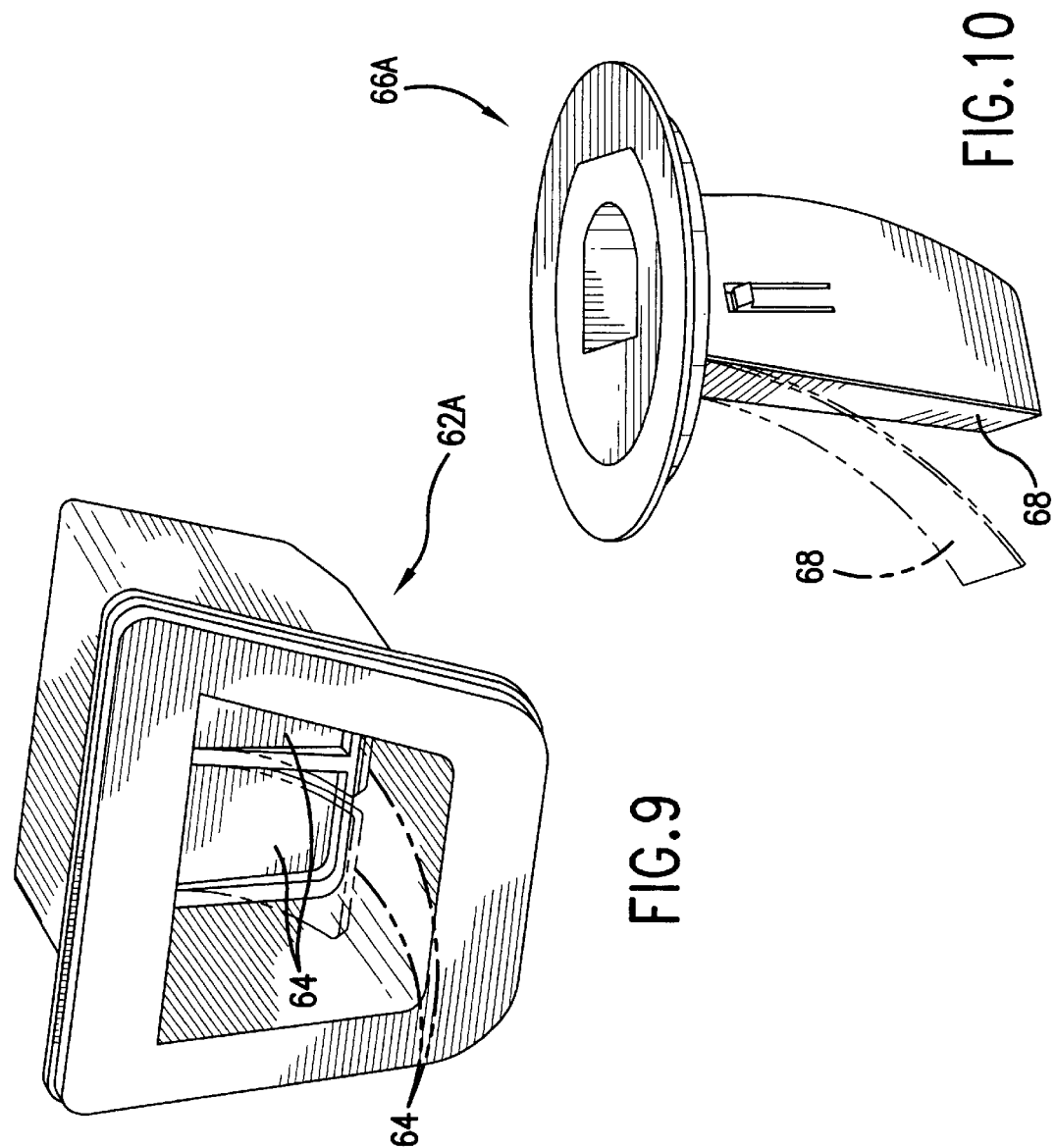
FIG.10
FIG.9
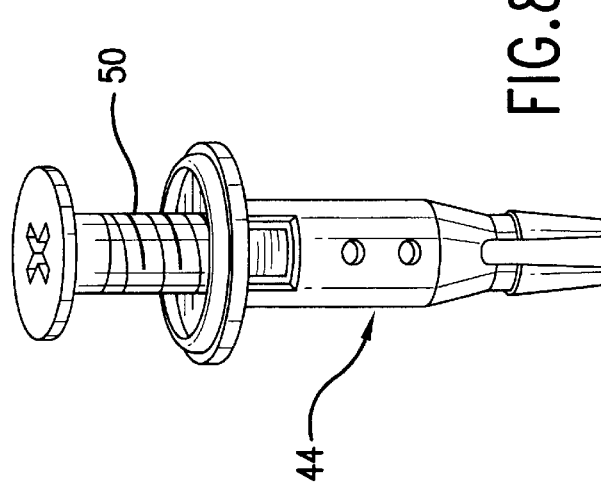
FIG.8

MAT FOR A MOTOR VEHICLE CARGO COMPARTMENT

TECHNICAL FIELD

This invention relates to floor mats for motor vehicle cargo compartments and more particularly to a rigid removable floor mat for a motor vehicle cargo compartment wherein the mat also provides for draining liquid from the vehicle.

BACKGROUND OF THE INVENTION

In motor vehicles such as those having a rear cargo compartment and a gate or door at the rear end for access, there is normally provided a sheet metal floor in the cargo area that is an integral part of the vehicle structure. Wherein the floor is normally separate from a permanently fastened front sill plate at the front of the cargo compartment and also a rear sill plate that is permanently fastened at the rear of the cargo compartment in the rear entry/exit way. The sheet metal floor is typically painted or may be provided with a protective plastic coating and the paint or coating has a color pigment that complements the vehicle's interior color scheme. The cargo floor may also be left bare or covered with a protective flexible floor mat or carpet that is typically made of rubber or fabric. Where a flexible floor mat or carpet is used, it may be removed for convenience in cleaning. But that is not the case with a cargo floor that is left bare and becomes dirty or messy as it is a permanent fixture in the vehicle as mentioned above.

In the latter case, cleaning of the cargo floor must normally be accomplished by access through the rear entry/exit way and possibly by access from an area in the vehicle forward of the cargo floor. Moreover, the cleaning requirements can vary considerably depending on the usage. For example, in the loading and unloading of cargo that is very dirty and messy, there may be required very thorough cleaning of both the cargo floor and rear sill plate with a suitable liquid cleaning agent as opposed to just needing to vacuum the floor. In the case of commercial vehicles that carry cargo on a regular basis, there may also be required often repeated cleaning and possibly after each cargo delivery.

Moreover, in the case where the cargo is liquid-containing vessels, there may occur significant liquid spills onto the cargo floor. Normally, some but not all of the spillage will drain off the rear edge of the floor through the rear entry/exit way when the rear door or gate is opened. Resulting in some of the spillage being left on the cargo floor at various locations until physically removed. But this may not be convenient to do until a considerably later time and by that time the spillage may make the cleaning of the cargo floor even more difficult. As a result, the vehicle user may be faced with very laborious cleaning in the confined space of the cargo compartment and may have to resort to costly commercial cleaning equipment or a commercial cleaning company. Moreover, in the case of where a strong liquid cleaning agent must be used, some or all of the surrounding vehicle interior trim must be protected from the cleaning agent if such interior trim is for example a fabric material prone to being adversely affected thereby.

SUMMARY OF THE INVENTION

The present invention departs from conventional practice in providing a rigid cargo mat that is non-permanently fastened over a sheet metal floor in the cargo compartment and has both an integral rear sill plate portion and integral channels that form part of a drainage system for draining liquid from both the front edge and rear edge of the mat to outside the vehicle. Whereby the rear sill plate is thus made removable with the cargo mat and wherein the channels in the mat collect any liquid deposited on the on the cargo mat such as cargo spillage, or water and/or a liquid cleaning agent used in cleaning the mat.

The liquid collected in the channels on the mat can drain from the mat in either a forward and/or a rearward direction in these channels and is directed there from via downwardly sloped channels and slots provided in the front sill plate to a trough in the floor region beneath the front sill plate and/or over the rear sill plate portion of the mat to channels that are provided in the floor region beneath the mat and are open, like the front sill plate slots, to the trough. With the liquid then exiting or draining from the vehicle via drain valves provided in both the trough and channeled regions of the floor. Moreover, the channels in the mat can also direct any collected liquid over the integral rear sill plate and out of the vehicle through the rear entry/exit way when the latter is open.

The rigid removable cargo mat with integral rear sill plate portion and drainage channels is preferably a molded lightweight part formed of a plastic composition with a skin containing a color pigment complementing the color scheme of the vehicle's interior trim. The mat is secured in place over the sheet metal floor in a cost efficient and very simple manner by a tab and a pair of pushpin fasteners that are easily fastened and released. The tab is formed integral with the front edge of the cargo mat in a central location and is received in a slot formed between the front sill plate and a slider plate mounted above the latter. The pushpin fasteners are received in holes in the integral rear sill plate portion of the mat and in corresponding holes in the floor following insertion of the tab in the slot and with the cargo mat fully in place.

Moreover, because the cargo mat with its integral rear sill plate portion is formed of a plastic material, it is not subject to staining. Or rusting which would be the case if it was formed of steel and though painted was scratched through usage.

Removal of the cargo mat from the vehicle through the rear entry/exit way for ease and convenience in cleaning is aided by a pair of handles that are formed integral with the rear sill plate portion of the cargo mat. Or by one or more pull straps that are fastened to the rear sill plate portion of the cargo mat in lieu of providing integral handles. With neither the integral handles or pull straps presenting an obstruction in the rear sill plate portion and especially on the upper side over which cargo and an entering person must pass.

With the pushpin fasteners released from the floor, the handles or pull straps are manually grasped by rear entry access to lift the rear end of the cargo mat upward to a clearance position relative to the supporting cargo floor and are then pulled on to slide the cargo mat rearward to release the tab from the slot. The cargo mat and integral rear sill plate portion is then pulled further rearward and slid through the rear entry/exit way to remove same from the vehicle for cleaning with a suitable cleaning agent. A person is thus not required to enter the cargo compartment in order to remove the cargo mat with its integral rear sill plate portion for the purpose of cleaning same separate from the vehicle.

The mat of the present invention is thus very durable as well as easily removable for cleaning. As well as provides for effecting drainage of any liquid deposited thereon regardless of whether the cargo compartment is open or closed and regardless of whether the vehicle is in a horizontal stance or on an incline.

These and other various aspects of the present invention will become more apparent from the following detailed description and accompanying drawings of certain exemplary embodiments of the invention.

BRIEF DESCRIPTION OF THE DRAWINGS

FIG. 8 is an enlarged three-dimensional view of one of the pushpin fasteners used to fasten the cargo mat in FIG. 1, FIG. 9 is an enlarged three-dimensional view of one of the trough drain valves in FIGS. 1–3, FIG. 10 is an enlarged three-dimensional view of one of the floor drain valves in FIGS. 1–3.

DESCRIPTION OF EXEMPLARY EMBODIMENTS

Figure 1:
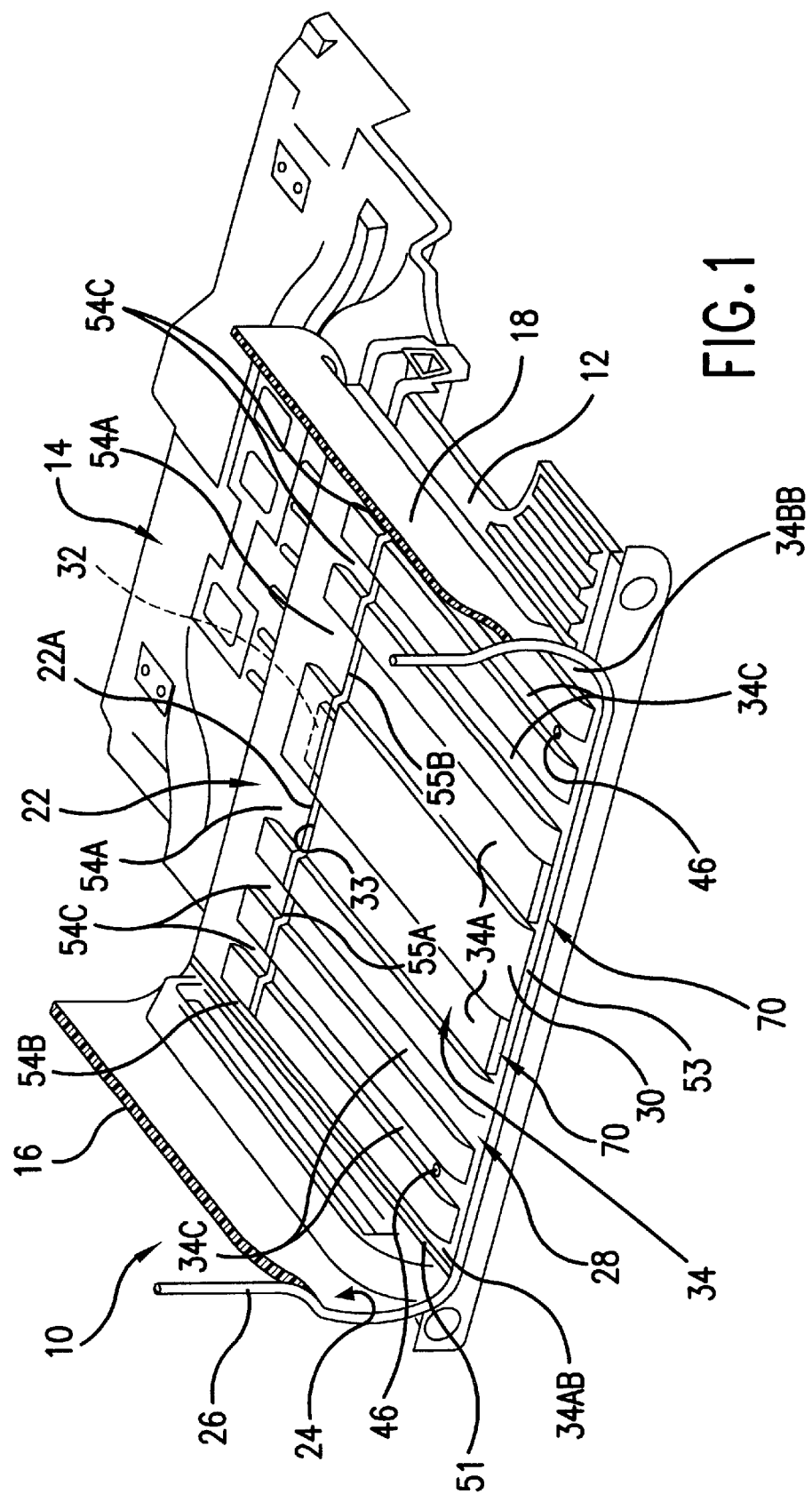
FIG. 1 is a partial three-dimensional view of a rear cargo compartment of a motor vehicle wherein the cargo compartment has incorporated therein one exemplary embodiment of the cargo mat according to the present invention.
Figure 2:
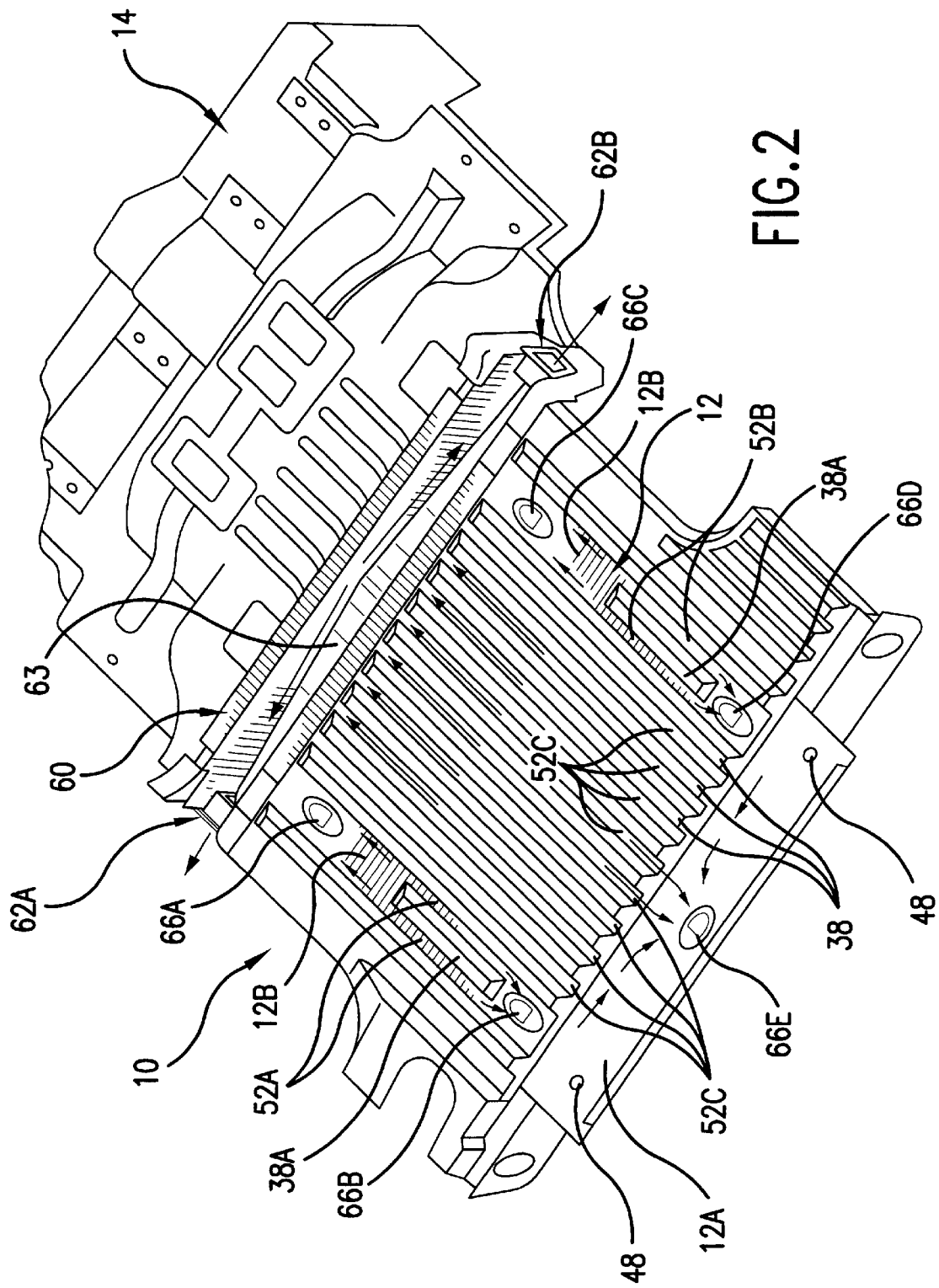
FIG. 2 is a view similar to FIG. 1 but showing the cargo mat, slider plate and front sill plate removed leaving the vehicle floor underneath exposed.
Figure 3:
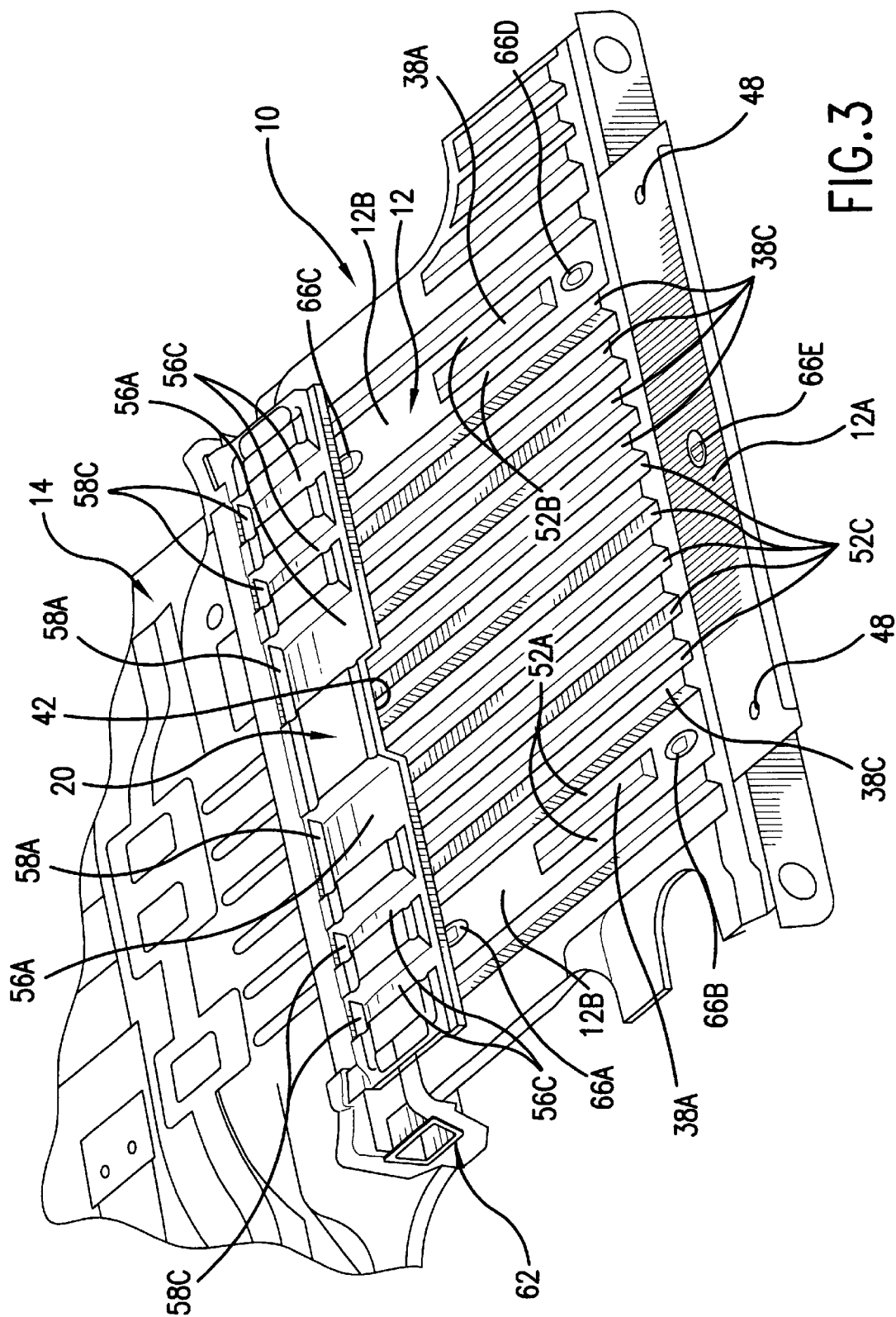
FIG. 3 is a view similar to FIG. 2 but from a different perspective angle and shows the front sill plate in place.
Figure 4:
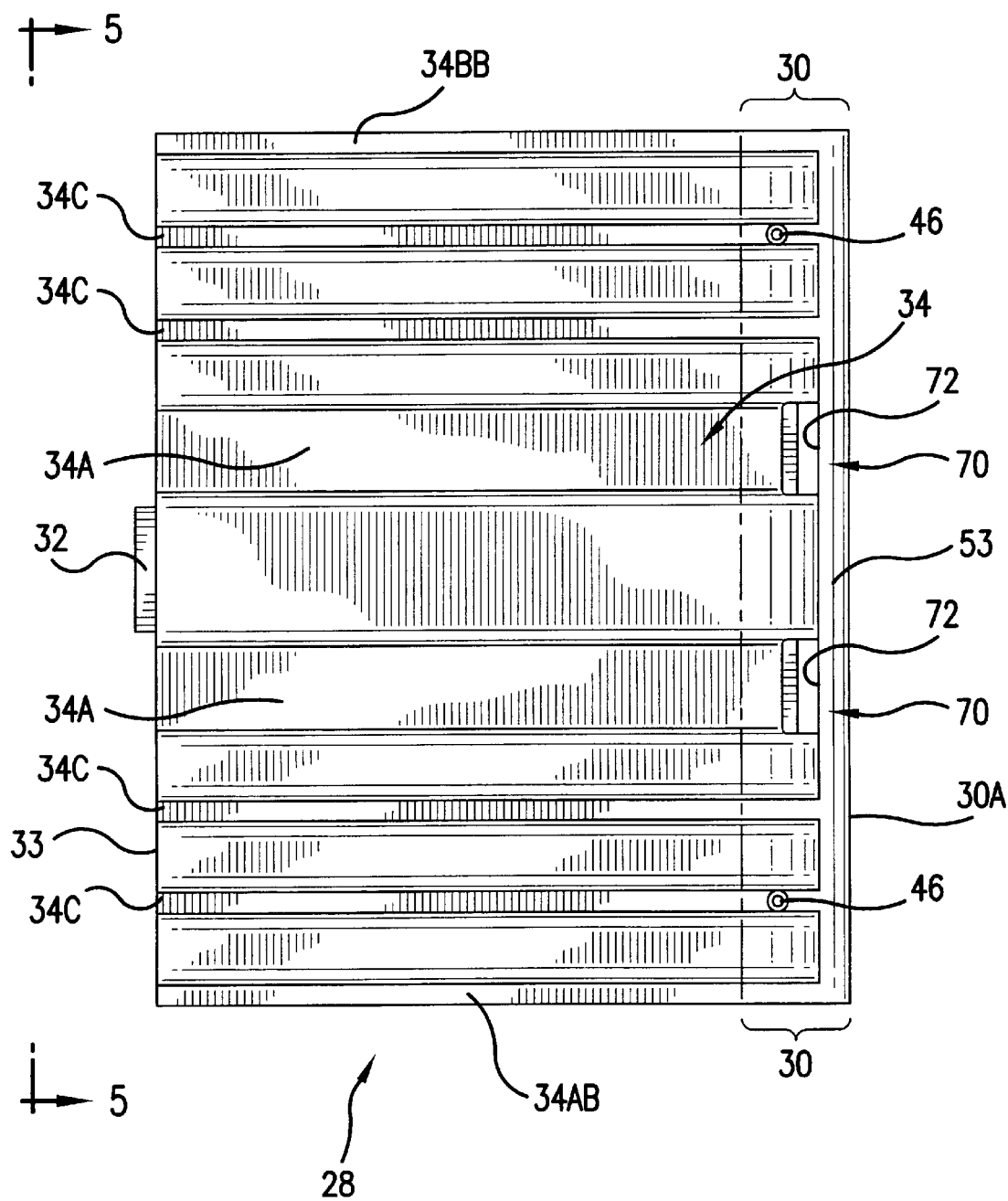
FIG. 4 is a top view of the cargo mat in FIG. 1.

Referring to FIGS. 1–3, there is shown a motor vehicle rear cargo compartment 10 located above a rear portion 12 of a floor 14 that is a part of the vehicle sheet metal structure. Wherein there are provided side trim panels 16 and 18 at opposite sides of the cargo compartment that are fastened in place as shown, a front sill plate 20 (see FIG. 3) formed of a plastic composition or metal that extends across the front end of the cargo compartment between the side trim panels and is fastened in place as shown, a slider plate 22 (see FIG. 1) also formed of a plastic composition or metal that covers the front sill plate and is also fastened in place as shown, and a rear entry/exit way 24 in the rear end of the vehicle through which the cargo compartment is accessed. The rear entry/exit way 24 is closed and opened in a conventional manner by a suitable gate or door (not shown) that engages an elastomeric seal 26 that is fastened in place as shown to the rear end of the cargo compartment about the rear entry/exit way.

In the rear cargo compartment 10, there is provided an easily removable, rigid cargo mat 28 that has a rectangular shape in order to fit the particular cargo compartment. The mat 28 is formed of a rigid, stain resistant, non-corrosive material in a molding process of a suitable conventional type. With the preferred mat material being urethane foam containing glass fibers covered with a urethane skin having a color pigment complementing the interior color scheme of the vehicle.

Figure 5:
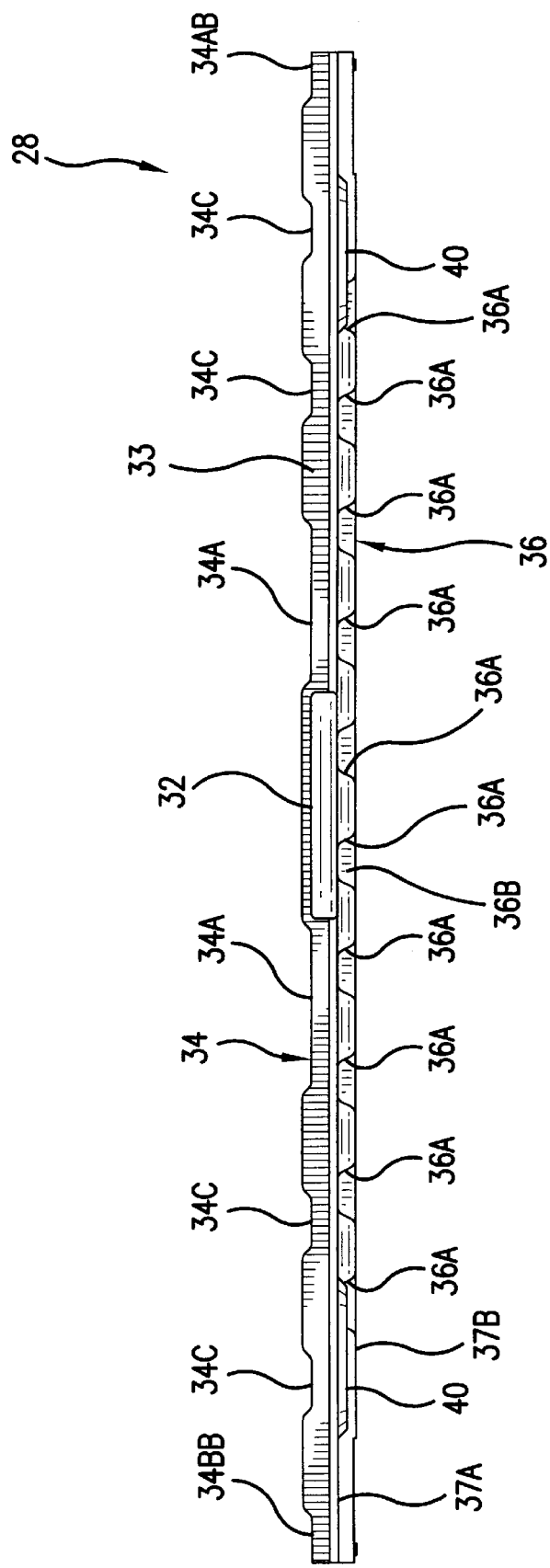
FIG. 5 is an end view of the cargo mat taken along the line 5—5 in FIG. 4 when looking in the direction of the arrows.
Figure 6:
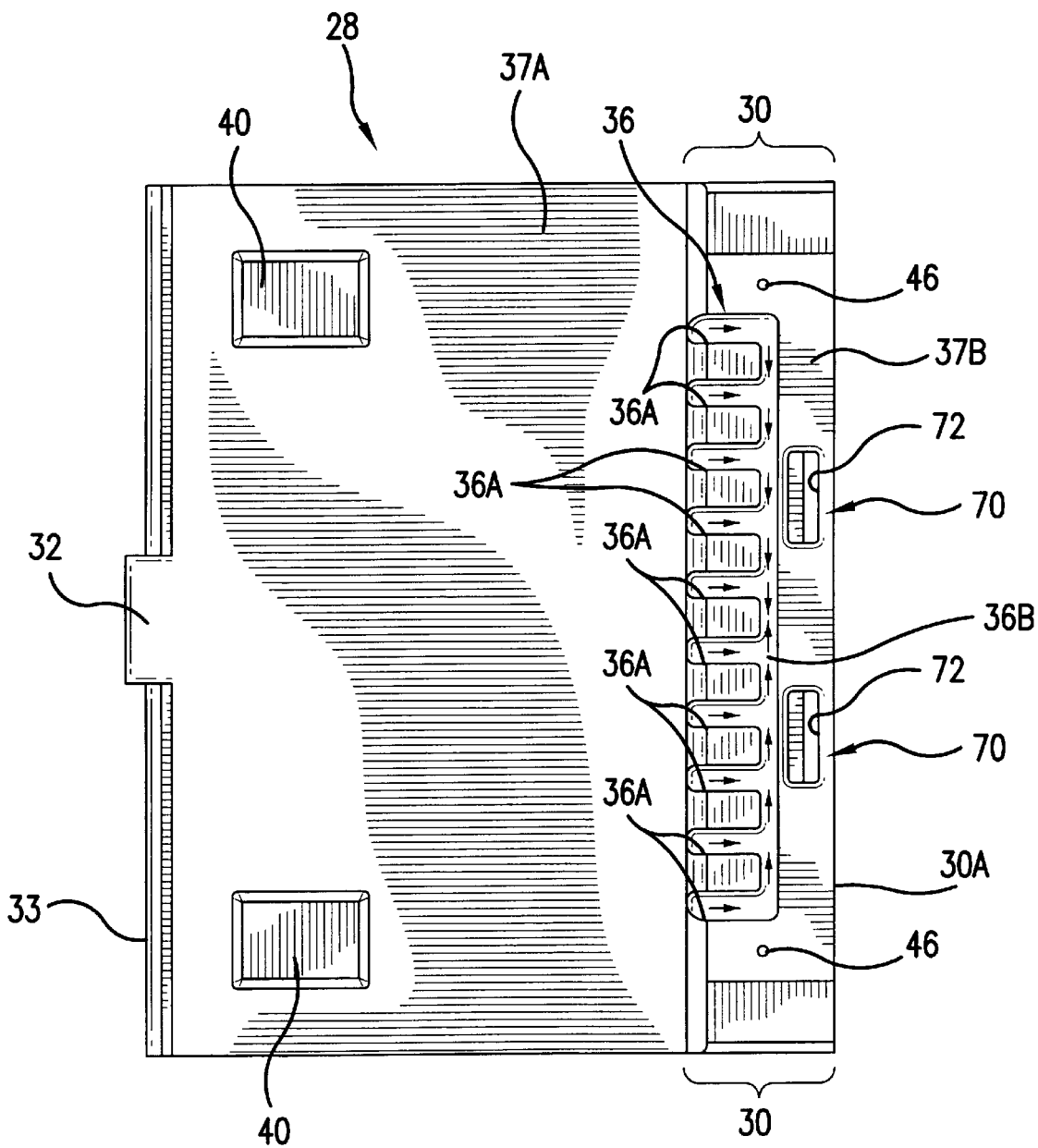
FIG. 6 is a bottom view of the cargo mat in FIG. 1.

Referring to FIGS. 1 and 4–6, the mat 28 has an integral rear sill plate portion 30 extending across the rear end thereof, an integral centrally-located tab 32 extending forwardly from a front edge 33 of the cargo mat, and an integral drainage management system comprising a parallel flow channel configuration generally designated as 34 formed in the top side of the cargo mat (see FIGS. 4 and 5) and a branched flow channel configuration generally designated as 36 formed in the bottom side of the cargo mat (see FIGS. 5 and 6).

As will be described in further structural and functional detail later, the channels forming the channel configurations 34 and 36 in the cargo mat 28 are adapted to cooperatively provide for quickly draining liquid deposited on the mat to a drainage system in the rear floor portion 12 when the rear entry/exit way 24 is closed or open. The channel configuration 34 on the topside of the mat also being adapted to quickly drain liquid deposited on the mat directly out through the rear entry/exit way when the latter is open.

Figure 7:
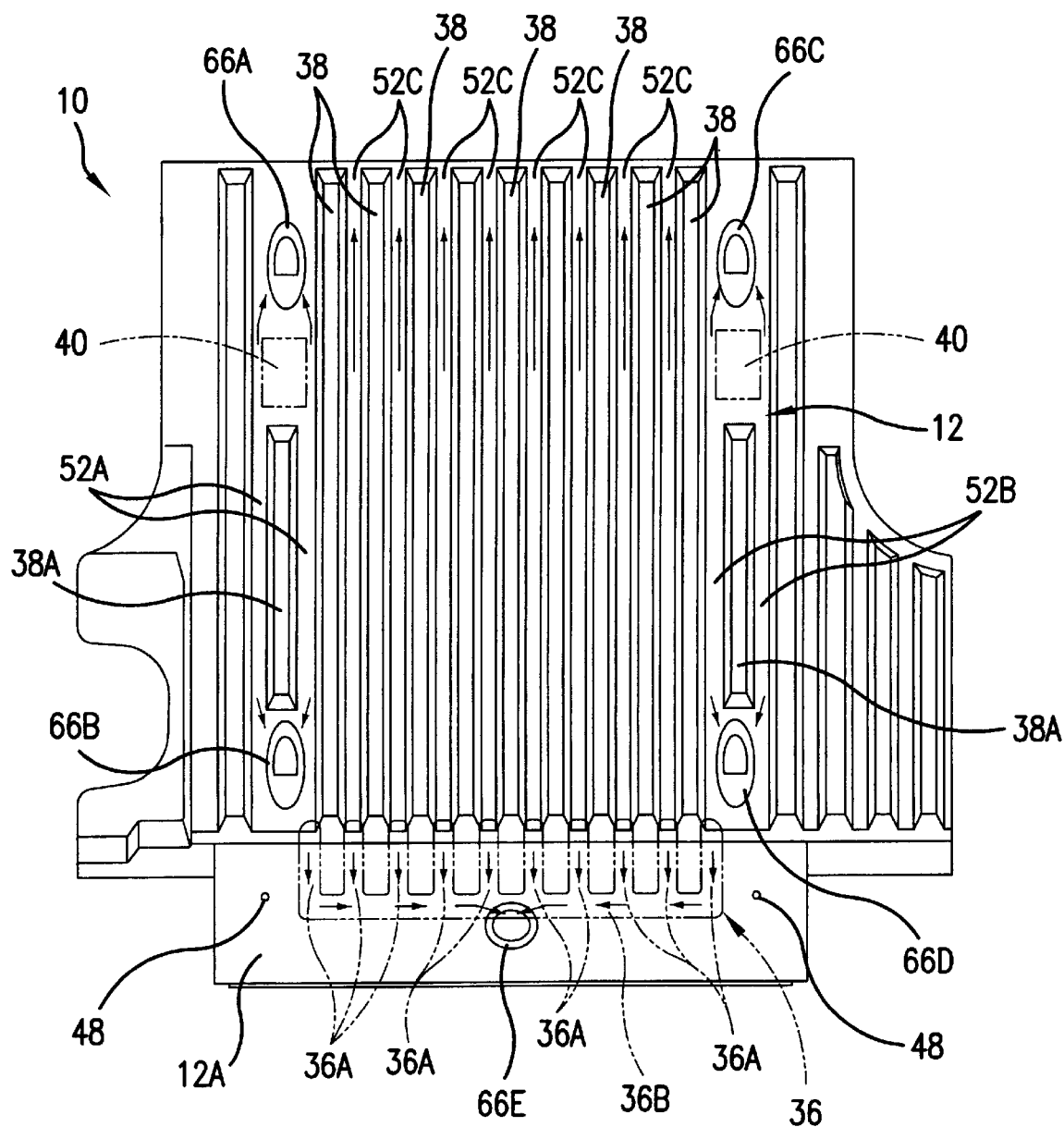
FIG. 7 is a top view of the exposed floor in FIG. 2 with the outline of the support pads and channels on the bottom side of the cargo mat shown on the floor in phantom lines.

The cargo mat extends over the floor portion 12 in the cargo compartment and is firmly and directly supported by the floor. Wherein a flat bottom side 37A of the mat below the parallel flow channel configuration 34 rests directly on longitudinally extending ribs 38 in the floor portion 12 and a flat bottom side 37B of the integral rear sill plate portion 30 containing the branched flow channel configuration 36 rests directly on a flat rear floor section 12A of the floor portion that extends beneath the rear entry/exit way. With the branched flow channel configuration 36 in the bottom side of the cargo mat 28 in the rear sill plate portion 30 thus extending over and across the flat rear floor section 12A as shown in phantom lines in FIG. 7 to provide for drainage as further described later.

In addition to the above described floor support of the mat, the mat is also formed with a pair of integral, downwardly-extending, rectangular-shaped support pads 40 on the flat bottom side 37A of the mat that are located in laterally spaced locations between the rear sill plate portion 30 and the front edge 33 of the mat. See FIGS. 5 and 6. The function of the pads 40 being to rest on flat sections 12B on the floor portion 12 where there are no floor ribs 38 to prevent very heavy loads on the mat from overstressing the mat in these forward regions. See FIG. 7 that shows in phantom lines where the pads 40 rest.

The cargo mat 28 is secured in place at its front end by the tab 32 that is slidably received in a three-sided mat retention slot 42 that is formed in the bottom side of the front sill plate 20. See FIGS. 1 and 3. With the tab 32 also serving to align the cargo mat for installation and thereafter hold the front end of the cargo mat down when the mat is fully in place as shown in FIG. 1.

The cargo mat 28, when fully in place, is held down at its rear end by a pair of readily releasable fasteners 44 preferably of the pushpin type shown in FIG. 8 which are sold under the name of "Scrulok" and are available from ITW Deltar Engineered Fasteners in Troy, Mich. The pushpin fasteners 44 are received in counter bored holes 46 in the rear sill plate portion 30 near the two rear corners thereof (see FIG. 4) and engage in corresponding holes 48 in the floor section 12A located directly there below (see FIG. 2). The pushpin fasteners 44 include a pin 50 that is easily manually pushed to firmly fasten the pushpin fastener in place and thereby secure the cargo mat in place as shown in FIG. 1 and is turned by a screw driver, in this case a Phillips screwdriver, to release the fastener and thereby the cargo mat for removal. Preferably, the pushpin fasteners 44 have a loose fit in the holes 46 in the mat to allow for variations in alignment between these holes and the holes 48 in the floor portion 12.

The channel configuration 34 on the upper side of the cargo mat comprises a plurality of parallel, longitudinally-extending channels which include two centrally located wide channels 34A of like width, two outwardly located open-sided narrow channels 34AB and 34BB of like width extending along the outer side edges of the mat adjacent the respective side trim panels 16 and 18, and two intermediately located narrow channels 34C of like width located between the outwardly located channels 34AB and 34BB and the closest centrally located wide channel 34A. The wide channels 34A are centrally located on the mat where spillage has been found to most likely occur and having a relatively large width as compared to the other channels 34AB, 34BB and 34C for that purpose. The channels in the top side of the mat all have a uniform and like depth from the front edge 33 of the cargo mat to the rear sill plate portion 30 where they open to a rear margin 53 that extends along the rear edge 30A of the rear sill plate portion 30 and the horizontal transverse portion of the seal 26.

In addition, the outer most channels 34AB and 34BB at the respective longitudinal side edges of the cargo mat have an open outer side that allows liquid collecting in these channels to not only travel along these channels but also spill over the side edges of the mat through a gap 51 at the lower edge of the side trim panels 16 and 18 to the underneath side of the mat and into two pairs of interconnected floor side channels 52A and 52B at opposite sides of the floor and wherein the liquid can then flow either forward or backward to drain from the vehicle as further described later. See FIGS. 1–3 and wherein only one of the gaps 51 is shown; namely the gap associated with trim panel 16 and which is shown in FIG. 1. As seen in FIGS. 2 and 3, the pairs of floor side channels 52A and 52B are formed by three of the floor ribs 38 wherein the intermediate rib 38A is a short rib to allow for the flat floor sections 12B for the support pads and also to allow for flat sections in these floor channels for the floor drain valves later described as well as provide for the interconnection of the channels in the respective pairs.

Referring to FIG. 1, the slider plate 22 has channels 54A and 54C that are closed at their forward end and align at their rearward end with the respective channels 34A and 34C in the mat to thereby form forward extensions of the latter channels which act to collect and direct liquid to the latter channels. Drainage at the forward end of the mat is provided by gaps 55A and 55B on opposite sides of the tab 32 between the front edge 33 of the mat and the rear edge 22A of the slider plate that open the channels 34A and 34C to corresponding channels 56A and 56C in the front sill plate 20 beneath the slider plate 22. See FIG. 3. The channels in the front sill plate 20 provide for forward drainage from the mat and for this purpose slope downward in a forward direction to respective slots or openings 58A and 58C in the front sill plate that are located directly above a trough 60 provided in the floor portion 12. See FIG. 2. As also seen in FIG. 2, the side floor channels 52A and 52B along with additional floor channels 52C formed in the floor portion 12 between the side channels 52A and 52B by other of the floor ribs 38 are all equally spaced and extend longitudinally of the vehicle and the mat and are also open at their forward end like the front sill plate channels to the trough 60 forming a part of a floor drainage system for draining liquid received from the mat.

The trough 60 extends transversely of the vehicle and like flapper type drain valves 62A and 62B, each with elastomeric valve members 64, are mounted in the respective ends of the trough and are operable to open the trough to the outside in response to the pressure of liquid buildup in the trough on these valves. With flow to the trough drain valves 62A and 62B facilitated by the trough having a bottom surface 63 that slopes downward from the center of the trough to these valves. See FIGS. 2 and 3 and also FIG. 9 that shows an enlargement of one of these valves; namely, valve 62A. Wherein in FIG. 9, the valve members 64 of the trough drain valve 62A are shown normally closed in solid lines and are shown open in phantom lines for allowing drainage.

Five (5) like floor drain valves 66A–E also provide for drainage of liquid received on the floor from the mat and are located in the floor portion 12 below the cargo mat at strategic locations so as to effectively accomplish drainage from the vehicle in conjunction with or separate from the trough drain valves 62A and 62B. Four of the floor drain valves; namely 66A–D, are located at flat areas in the floor portion 12 that are open to certain of the floor side channels; the valves 66A and 66B being open to and situated in and near to the respective ends of the side floor channels 52A and the valves 66C and 66D being open to and situated in and near to the respective ends of the opposite side floor channels 52B. The branched channel configuration 36 in the bottom side of the rear sill plate portion 30 of the mat interconnects the rearward ends of all the floor channels 52A–C to provide for drainage as further described later. The remaining fifth floor drain valve 66E is centrally located in the flat rear floor section 12A at a location so as to be open to the channel configuration 36 and thus to all the floor channels 52A–C to provide for drainage as also further described later.

The floor drain valves 66A–E each have an elastomeric valve member 68 and are operable to open the associated floor channels to the outside in response to the pressure of liquid buildup in the associated channels on these valves. See FIGS. 2 and 3 and also FIG. 10 that shows an enlargement of one of these valves; namely, drain valve 66A. Wherein in FIG. 10, the valve member 68 of the floor drain valve 66A is shown normally closed in solid lines and is shown open in phantom lines for allowing drainage.

The branched channel configuration 36 in the bottom side of the mat 28 and the floor channels 52A–C provide a flow network that can direct liquid from the side channels 34AB and 34BB on the mat via the respective side floor channels 52A and 52B to the respective pairs of the floor drain valves 66A, 66B and 66C, 66D and to the trough 60 and thus the trough drain valves 62A and 62B and also to the rearmost floor drain valve 66E located in the floor section 12A below the rear sill plate portion 30 of the mat. The intermediate floor channels 52C can also direct liquid to the trough 60 and thus the trough drain valves 62A and 62B and also to the bottom side channel configuration 36 in the mat and thus the rearmost floor drain valve 66E. See the directional flow arrows in FIGS. 2, 6 and 7.

For effecting such flow patterns underneath the rear sill plate portion 30 of the mat and over the rear flat floor section 12A, the channel configuration 36 in the bottom side of the mat comprises a plurality of relatively short channels 36A that extend forwardly as branches from a single, relatively long, transverse channel 36B and form extensions to the rear ends of the floor channels 52A–C. The long transverse channel 36B is open at a central location to the rear most floor drain valve 66E (see FIG. 7) and as a result, when liquid flows rearward through the floor channels 52A–C and then into the short channels 36A that are thus interconnected by the long transverse channel 36B, the liquid is directed to the centrally located rearmost floor drain valve 66E in the flat floor section 12A as shown by the flow arrows in FIG. 2, 6 and 7.

Describing now the drainage operations as managed by the cargo mat 28 in typical situations, when the cargo mat is horizontal or is tilted down at the rearward end thereof because of the vehicle facing forward on an upward slope, any liquid deposited on the cargo mat is collected by one or more of the channels 34A, 34AB, 34BB and 34C depending on where the liquid is deposited and is thereby caused to flow rearward and drain from the vehicle over the integral rear sill plate portion 30 when the rear gate or door is open. Or when the rear gate or door is closed, the liquid can flow over the rear sill plate portion 30 to the rear edge of the mat and then flow along the door seal 26 to the rear outer corners of the mat and then flow over the side edges of the mat into the side floor channels 52A and 52B. Where the liquid can then flow to the rearmost floor drain 66E via the branched channel configuration 36 on the bottom side of the mat. Depending on the amount of flow, the liquid can if need be also then flow via the branched channel configuration 36 and the floor channels 52A–C to the other floor drain valves 66A–D and eventually the trough 60 and the trough drain valves 62A and 62B. See the flow paths indicated by the directional arrows in FIGS. 2 and 6.

On the other hand, when the cargo mat is horizontal or tilted down at the forward end thereof because of the vehicle facing forward on a downward slope, any liquid collected by any one or more of the channels 34A and 34C can flow forward where it is directed into the trough 60 by the channels 56A and 56C and slots 58A and 58C in the front sill plate 20. With the liquid then draining from the vehicle via the trough drain valves 62A and 62B. While any liquid collected by the side channels 34AB and 34BB can flow over the side edges of the mat to the side floor channels 52A and 52B where the liquid can then drain through the floor drains valves and also to the trough and through the trough drain valves. It will thus be appreciated that when the vehicle and thus the cargo mat is horizontal or not tilted, the liquid collected by the channels in the cargo mat can flow both forward and rearward in these channels to drain from the vehicle in the manner described above and regardless of whether the rear gate or door is open or closed.

Easy removal of the cargo mat 28 and integral rear sill plate portion 30 from the vehicle through the rear entry/exit way 24 for ease in cleaning the cargo mat free of the vehicle is provided by a pair of handles 70 that are formed in laterally spaced locations in the cargo mat in the integral rear sill plate portion 30. The handles 70 are simply formed by elongated holes 72 in the integral rear sill portion 30 so as to be flush with the cargo mat at both its topside and bottom side. The handles 70 thus do not present a protruding obstruction at the upper side or surface of the cargo mat nor on the bottom side thereof. Especially not at the upper side over which cargo passes as well as persons accessing the cargo compartment.

The handles 70 are adapted to be manually grasped following removal of the pushpin fasteners 44 all by rear entry access and provide for lifting the rear end of the cargo mat upward and then pulling same rearward to release the tab 32 from the slot 42. With the cargo mat and integral rear sill plate portion then pulled further rearward and slid or lifted through the rear entry/exit way to remove same from the vehicle for cleaning with water and/or a suitable cleaning agent. Such cargo mat removal also allows the cleaning of debris from the drain valves and drying of the sheet metal floor under the mat. With the handles 70 also providing for ease in handling in reinstalling the cargo mat in the vehicle following cleaning as well as ease in initially installing the cargo mat in the vehicle.

Figure 11:
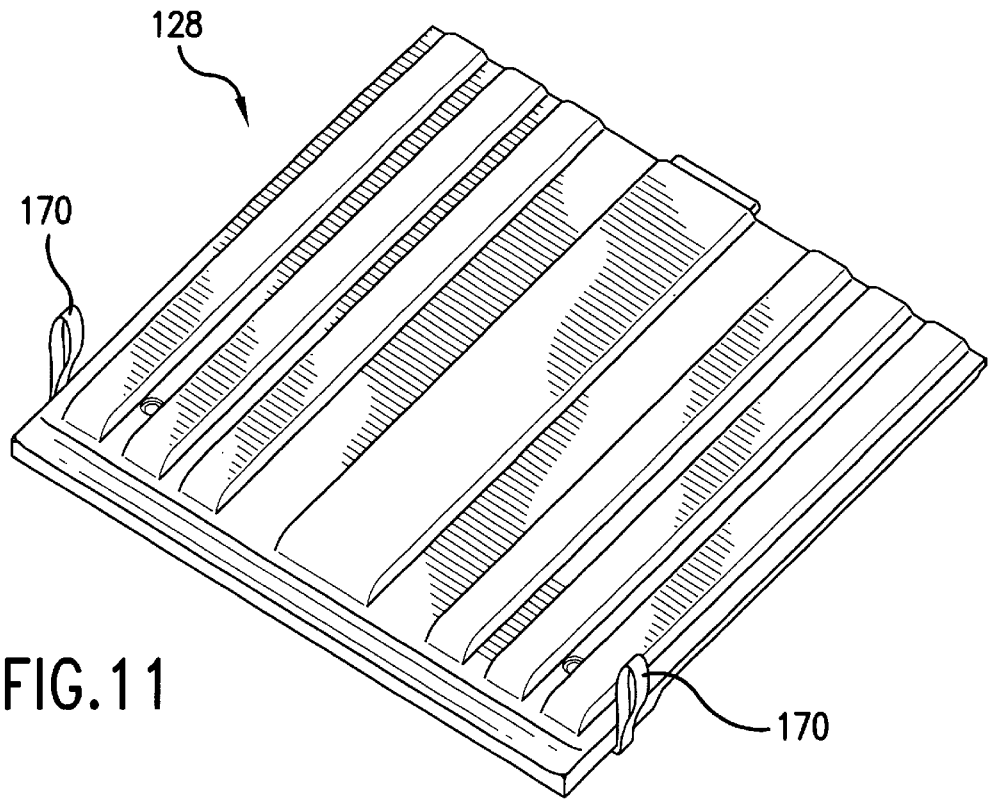
FIG. 11 is a three-dimensional view of another exemplary embodiment of the cargo mat according to the present invention.
Figure 12:
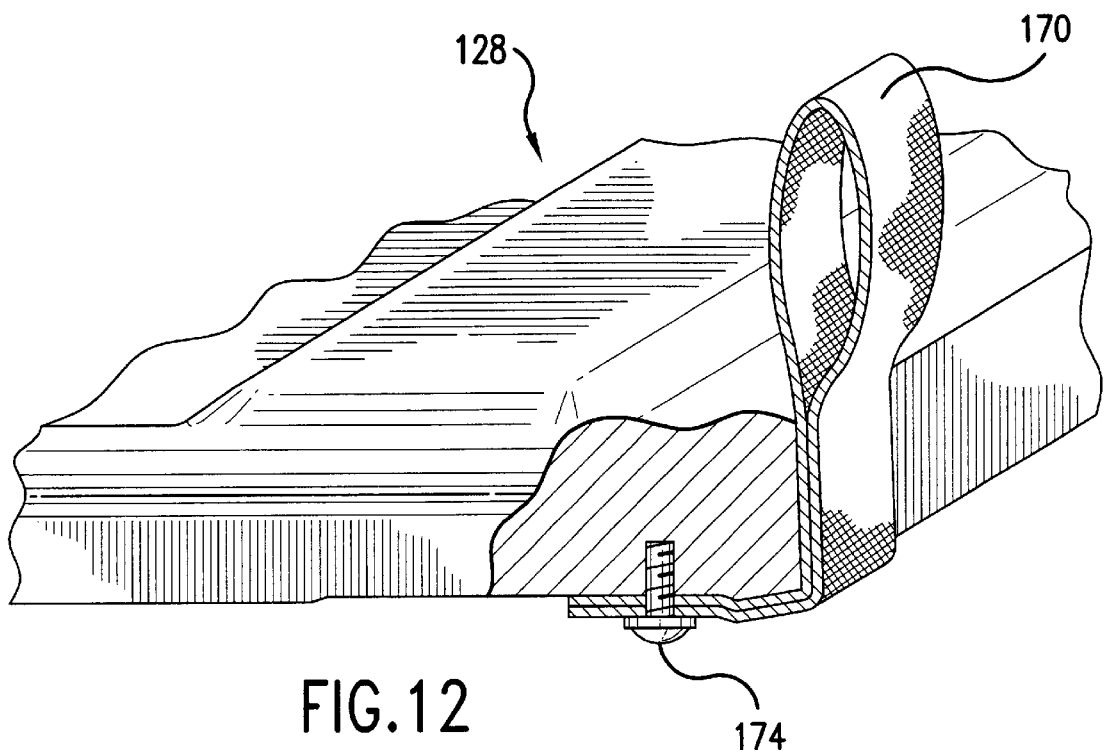
FIG. 12 is an enlarged view of a rear corner portion of the cargo mat in FIG. 11 showing one of the two strap loop handles and with a part of the mat broken away to show how the handles are fastened.

Referring to FIGS. 11 and 12, there is shown a modified form of the cargo mat identified by the reference number 128 wherein a pair of strap loop handles 170 has replaced the integrally formed handles 70 and wherein the cargo mat 128 is otherwise like mat 28. The strap loop handles 170 are preferably made of nylon and are each fastened to the cargo mat 128 by a screw 174 at directly opposite side locations near the rear corners of the rear sill plate portion of the mat. Or they may be fastened to the rear edge of the mat near the corners of the mat. Or only one such strap loop handle may be provided and preferably in a central location at the rear edge of the mat. In either case, the strap loop handle(s) does not in any significant way interfere with accessing the cargo compartment.

Having described the preferred cargo mat construction, it will be appreciated that the composition of the cargo mat can take other suitable forms in accordance with the present invention. For example, another cargo mat construction also found to be very suitable is a honeycomb plastic structure overlaid with a nylon skin and covered with a urethane or vinyl/rubber compound with an appropriate color pigment. In addition, while pushpin fasteners are preferred, other easily installed and releasable fasteners of some other suitable conventional type can be used.

Furthermore, while the use of two fasteners and only one tab has proven to be entirely adequate in securely holding the cargo mat in place, it will be understood that one or more additional fasteners and tabs can be added if desired. It will also be understood that the number and configuration of the channels and the configuration and number of support pads on the bottom side of the cargo mat can be varied to meet the needs of a particular mat installation and the anticipated loads to be carried by the mat. Moreover, the number and location of the both the floor and trough drain valves can be varied without having to alter the drainage management system of the cargo mat. For example, there may be only one trough drain valve and only one floor drain valve with the trough and the floor configured to direct the liquid as managed by the mat to where these drain valves are then best located and which for further example could be a central location in both the floor and in the trough and wherein the drain valve in the trough could be located either in the bottom thereof or in one side thereof.

The above-disclosed exemplary embodiments are thus intended to be illustrative of the invention and it is foreseeable that various modifications thereof will become apparent to those skilled in this art by this enabling disclosure. Therefore it is intended that the present invention be limited only by the scope of the appended claims.

What is claimed is:

1. A rigid removable cargo mat for a cargo compartment of a motor vehicle wherein said compartment has a floor and a front sill plate and a rear entry/exit way and wherein said floor has a floor drainage system adapted to drain from the vehicle any liquid delivered to said floor drainage system from said cargo mat and wherein said front sill plate has openings that are open to said floor drainage system, said cargo mat having an integral rear sill plate portion at a rear end of said cargo mat extending into said rear entry/exit way, said cargo mat adapted to be firmly supported above and by said floor, releasable fastening means for fastening said cargo mat to said floor, and said cargo mat having a top side with channels adapted to collect any liquid deposited on said cargo mat and direct the collected liquid to drain from the vehicle via passage over said rear sill plate portion and out said entry/exit way when said entry/exit way is open and also to direct the collected liquid to said floor drainage system through said openings in said front sill plate at a front end of said cargo mat when said entry/exit way is closed and also when said entry/exit way is open.

2. A cargo mat as defined in claim 1 wherein said releasable fastening means comprises at least one tab formed integral with said front end of said cargo mat, and at least one releasable fastener operatively associated with said rear sill plate portion.

3. A cargo mat as defined in claim 1 wherein said cargo mat is formed of glass fiber containing urethane foam with a urethane skin having a color pigment.

4. A cargo mat as defined in claim 1 wherein said rear sill plate portion has a bottom side having channels adapted to assist said floor drainage system in draining liquid from the vehicle.

5. A cargo mat as defined in claim 1 wherein at least one handle is fastened to said rear sill plate portion.

6. A cargo mat as defined in claim 1 wherein at least one handle is integrally formed in said rear sill plate portion.

7. A cargo mat as defined in claim 1 wherein at least some of said channels have different widths.

8. A cargo mat as defined in claim 1 wherein at least some of said channels have different widths, and all of said channels have the same depth.

9. A cargo mat as defined in claim 1 wherein said channels include side channels extending along side edges of said cargo mat, and said side channels have an open side adapted to allow liquid to flow over said side edges to said floor drainage system.

10. A cargo mat as defined in claim 1 wherein said channels comprise a plurality of narrow channels and at least one wide channel located between said narrow channels.

11. A cargo mat as defined in claim 1 wherein said releasable fastening means comprises a tab formed integral with and extending centrally from a front edge of said cargo mat and at least one releasable fastener operatively associated with said rear sill plate portion.

12. A cargo mat as defined in claim 1 having a bottom side with at least one integral depending support pad located between said rear sill plate portion and said front end of said cargo mat and adapted to rest on a flat area of said floor.

13. A cargo mat as defined in claim 1 having a bottom side with two integral depending laterally spaced support pads located between said rear sill plate portion and said front end of said cargo mat and adapted to rest on flat areas of said floor.

14. A cargo mat as defined in claim 1 having handles fastened to a bottom side of said rear sill plate portion and extending over opposite side edges of said rear sill plate portion.

15. A cargo mat as defined in claim 1 having a handle fastened to a bottom side of said rear sill plate portion and extending around an end edge of said rear sill plate portion.

16. A cargo mat as defined in claim 9 wherein said floor drainage system has a plurality of drain valves wherein one of said drain valves is located in said floor under said rear sill plate portion, said floor drainage system further having floor channels adapted to receive liquid from said side channels in said cargo mat and channel the liquid to the other of said drain valves, and a bottom side of said rear sill plate portion having interconnected channels adapted to form extensions of said floor channels and channel liquid from said floor channels to said one drain valve.

17. A cargo mat as defined in claim 16 wherein said channels in said bottom side of said rear sill plate portion comprise a plurality of relatively short channels interconnected by a relatively long channel wherein said short channels are adapted to form extensions of said floor channels and cooperate with said long channel to channel liquid from said floor channels to said one drain valve.

18. A cargo mat as defined in claim 16 wherein said drainage system has a trough with at least one drain valve, and said channels on said top side of said mat and said floor channels are adapted to channel liquid to said trough.

19. A cargo mat as defined in claim 16 wherein said drainage system has a trough with at least one drain valve, and said channels on said top side of said cargo mat are adapted to direct liquid through said openings in said front sill plate to said trough.

20. A cargo mat as defined in claim 16 wherein said drainage system has a trough with at least one drain valve, said channels on said top side of said mat and said floor channels are adapted to channel liquid to said trough, and said channels on said top side of said cargo mat are adapted to direct liquid through said openings in said front sill plate to said trough.

21. A cargo mat as defined in claim 1 wherein said cargo mat is a honeycomb plastic structure overlaid with a nylon skin and covered with a plastic material having a color pigment.

* * * * *